(12) United States Patent
Nishihata et al.

(10) Patent No.: US 7,151,138 B2
(45) Date of Patent: Dec. 19, 2006

(54) RESIN COMPOSITION OF POLY(ARYL KETONE), POLY(ARYLENE SULFIDE) AND THERMOSETTING IMIDE RESINE

(75) Inventors: Naomitsu Nishihata, Fukushima (JP); Masahito Tada, Fukushima (JP)

(73) Assignee: Kureha Corporation, Tokyo (JP)

( * ) Notice: Subject to any disclaimer, the term of this patent is extended or adjusted under 35 U.S.C. 154(b) by 405 days.

(21) Appl. No.: 10/694,365

(22) Filed: Oct. 27, 2003

(65) Prior Publication Data

US 2004/0087733 A1 May 6, 2004

(30) Foreign Application Priority Data

Oct. 28, 2002 (JP) ............................. 2002-313128

(51) Int. Cl.
*C08L 71/10* (2006.01)
*C08L 81/04* (2006.01)

(52) U.S. Cl. ....................................... 525/153; 525/471
(58) Field of Classification Search .................... None
See application file for complete search history.

(56) References Cited

U.S. PATENT DOCUMENTS

| 4,176,222 A | 11/1979 | Cinderey et al. |
|---|---|---|
| 4,684,699 A | 8/1987 | Robeson |
| 2002/0107335 A1* | 8/2002 | Nishihata et al. ........... 525/418 |

FOREIGN PATENT DOCUMENTS

| CA | 1236642 | 6/1985 |
|---|---|---|
| EP | 0241019 | 10/1987 |
| EP | 0321215 | 6/1989 |
| EP | 950691 | * 10/1999 |
| JP | 63-33775 | 7/1988 |
| JP | 63205358 | * 8/1988 |
| JP | 01-282252 | 11/1989 |
| JP | 01-282253 | 11/1989 |
| JP | 01-282254 | 11/1989 |
| JP | 01-282255 | 11/1989 |

* cited by examiner

*Primary Examiner*—David J. Buttner
(74) *Attorney, Agent, or Firm*—Dinsmore & Shohl LLP

(57) ABSTRACT

A resin composition comprises a resin component containing 40 to 99% by mass of a poly(aryl ketone) and 1 to 60% by mass of a poly(arylene sulfide), and 0.1 to 5 parts by mass, per 100 parts by mass of the resin component, of at least one thermosetting imide resin selected from the group consisting of a polyfunctional unsaturated imide compound and its thermoset product. The resin composition is improved in terms of compatibility, moldability or formability, melt flowability, mechanical properties, etc. while maintaining high levels of various properties such as heat resistance, flame retardancy, chemical resistance and dimensional stability.

16 Claims, No Drawings

RESIN COMPOSITION OF POLY(ARYL KETONE), POLY(ARYLENE SULFIDE) AND THERMOSETTING IMIDE RESINE

FIELD OF THE INVENTION

The present invention relates generally to a resin composition comprising a poly(aryl ketone) and a poly(arylene sulfide), and more particularly to a resin composition that is improved in terms of compatibility, formability or moldability, melt flowability, mechanical properties, etc. while maintaining high levels of various properties such as heat resistance, flame retardancy, chemical resistance and dimensional stability.

BACKGROUND ART

Having a molecular structure comprising an ether bond rich in toughness and a phenylene group rich in rigidity and heat resistance, poly(aryl ketone)s represented by poly(ether ether ketone) (hereinafter PEEK for short) are crystalline thermoplastic resins excelling in heat resistance, flame retardancy, chemical resistance, dimensional stability, mechanical properties, etc. The poly(aryl ketone)s have very large fiber-reinforcement effects, and excel in thermal stability as well. For this reason, they are finding a wider range of applications as electric and electronic components, precision device components, automotive parts, etc. However, the poly(aryl ketone)s, albeit being high-performance resins, have found only limited applications because of their high prices. Besides, the poly(aryl ketone)s have processing temperatures of generally as high as about 390 to 410° C. and allowable ranges for processing conditions remain narrow with the addition of fibrous fillers thereto.

On the other hand, poly(arylene sulfide)s (hereinafter PAS for short) represented by poly(phenylene sulfide) (PPS for short) are crystalline thermoplastic resins excelling in heat resistance, flame retardancy, chemical resistance, dimensional stability, mechanical properties, etc., finding a wider spectrum of applications as electric and electronic components, precision device components, automotive parts, etc. PPS costs less than does the poly(aryl ketone). However, PAS has only limited applications in high temperature endurance fields because it is lower than the poly(ether ketone) in terms of crystal melting point, glass transition temperature and deflection temperature under load.

To improve the processability of the poly(aryl ketone), an alloy comprising PAS blended with the poly(aryl ketone), i.e., a resin composition has been proposed in the art (U.S. Pat. No. 4,684,699). This resin composition is lower in processing temperature and better in balances among physical properties than the poly(aryl ketone). With the poly(aryl ketone) and PAS, it is still difficult to obtain any resin composition having satisfactory mechanical properties such as tensile strength and bending strength, because they are less compatible with each other.

Resin compositions in which carbon fibers, glass fibers, potassium titanate fibers or ceramic fibers are added to an alloy comprising the poly(ether ketone) and PPS resins have also been put forward in the art (JP-A's1-282252, 1-282253, 1-282254 and 1-182255). However, these resin compositions, too, are found to have no sufficient mechanical properties because the poly(aryl ketone) and PAS are less compatible with each other.

SUMMARY OF THE INVENTION

A primary object of the present invention is to provide a resin composition containing a poly(aryl ketone) and a poly(arylene sulfide), which is substantially improved in terms of the compatibility of both, and excels in moldability or formability, melt flowability, mechanical properties, etc. while keeping high levels of various properties such as heat resistance, flame retardancy, chemical resistance and dimensional stability.

The inventors have made extensive and intensive studies to attain the above object and consequently found that if at least one thermosetting imide resin selected from the group consisting of a polyfunctional unsaturated imide compound and its thermoset product is added to a resin component containing a poly(aryl ketone) and a poly(arylene sulfide) at a specific ratio, it is then possible to significantly improve the compatibility of both, thereby providing a resin composition having improved mechanical properties.

The resin composition of the invention is improved in terms of melt flowability upon melt molding or forming, too, so that burring upon injection molding can be reduced. Undetrimental to various properties such as heat resistance, flame retardancy, chemical resistance and dimensional stability that both the poly(aryl ketone) and the poly(arylene sulfide) possess, the resin composition of the invention keeps high levels of such various properties. Such findings have underlain the present invention.

Thus, the present invention provides a resin composition, comprising:

a resin component containing (A) 40 to 99% by mass of a poly(aryl ketone) and (B) 1 to 60% by mass of a poly(arylene sulfide), and (C) 0.1 to 5 parts by mass, per 100 parts by mass of said resin component, of at least one thermosetting imide resin selected from the group consisting of a polyfunctional unsaturated imide compound and a thermoset product thereof.

DETAILED DESCRIPTION OF THE INVENTION

1. Poly(Aryl Ketone)

Representative of the poly(aryl ketone) used herein are a poly(ether ether ketone) (PEEK) comprising a repeating unit represented by the following formula (1), and a poly(ether ketone) (hereinafter PEK for short) comprising a repeating unit represented by the following formula (2).

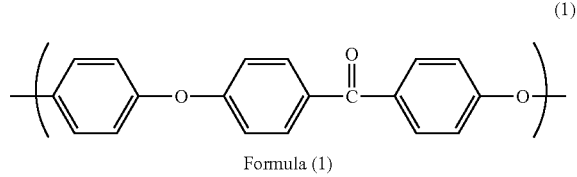

Formula (1)

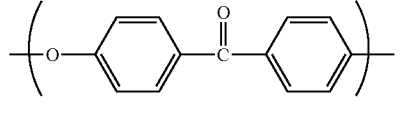

Formula (2)

Commercially available poly(aryl ketone) products may all be used herein. These poly(aryl ketone) products may be used alone or in combination of two or more.

Poly(aryl ketone)s, for instance, may be prepared by the method set forth in U.S. Pat. No. 4,176,222. Commercially available products include "Victrex PEEK®" comprising PEEK corresponding to formula (1) and "Victrex PEK®" comprising PEK corresponding to formula (2), available from VICTREX Co., Ltd., which have been imported and sold in Japan through Sumitomo Chemical Co., Ltd. and Mitsui Chemicals Co., Ltd.

The proportion of the poly(aryl ketone) contained in the resin composition of the invention should be in the range of 40 to 99% by mass, preferably 45 to 95% by mass, and more preferably 50 to 90% by mass on the basis of the total amount of poly(aryl ketone) and PAS. As the proportion of the poly(aryl ketone) contained is too low, the heat resistance of the resin composition becomes insufficient for use in high temperature endurance applications, and the injection moldability and extrudability thereof become insufficient as well. As the proportion of the poly(aryl ketone) contained is too high or the proportion of PAS contained is too low, no effect on cost reductions is obtainable with insufficient effects on deburring.

2. Poly(Arylene Sulfide)

The poly(arylene sulfide) (PAS) used herein is an aromatic polymer comprising as a main unit an arylene sulfide repeating unit represented by the formula [—Ar—S—] where —Ar— stands for an arylene group. Suppose here that the (basic) number of moles of the repeating unit [—Ar—S—] is 1 mole. Then, the PAS used herein is a polymer that contains the repeating unit in an amount of usually at least 50 mol %, preferably at least 70 mol %, and more preferably at least 90 mol %.

The arylene group, for instance, includes p-phenylene group, m-phenylene group, a substituted phenylene group that should preferably have as a substituent an alkyl group having 1 to 6 carbon atoms or a phenyl group, p,p'-diphenylenesulfone group, p,p'-diphenylene group, p,p'-diphenylenecarbonyl group and naphthylene group. For the PAS it is preferable to use a polymer mainly comprising identical arylene groups in its main chain, although copolymers containing two or more different arylene groups may be used when processability and heat resistance are put first.

Among these eePASs, particular preference is given to PPS comprising as a main unit a p-phenylene sulfide repeating unit because of satisfactory processability and ease of industrial access. Besides, poly(arylene ketone sulfide), poly(arylene ketone ketone sulfide) or the like may be used. Exemplary copolymers include a random or block copolymer comprising a p-phenylene sulfide repeating unit and an m-phenylene sulfide repeating unit, a random or block copolymer comprising a phenylene sulfide repeating unit and an arylene ketone sulfide repeating unit, a random or block copolymer comprising a phenylene sulfide repeating unit and an arylene ketone ketone sulfide, and a random or block copolymer comprising a phenylene sulfide repeating unit and an arylene sulfone-sulfide repeating unit. These PASs should preferably be each a crystalline polymer. In addition, the PASs should preferably be each a straight chain form of polymer in view of toughness, strength, etc.

Such PASs may be obtained by known methods relying on polymerization reactions of alkaline metal disulfides with dihalogen-substituted aromatic compounds in polar solvents (for instance, JP-B 63-33775).

The alkaline metal sulfide, for instance, may include lithium sulfide, sodium sulfide, potassium sulfide, rubidium sulfide and cesium sulfide. Sodium sulfide formed by the reaction of NaSH and NaOH in a reaction system, too, may be used as an example.

The dihalogen-substituted aromatic compound, for instance, may include p-dichlorobenzene, m-dichlorobenzene, 2,5-dichlorotoluene, p-dibromobenzene, 2,6-dichloronaphthalene, 1-methoxy-2,5-dichlorobenzene, 4,4'-dichlorodiphenyl, 3,5-dichlorobenzoic acid, p,p'-dichlorodiphenyl ether, 4,4'-dichlorophenylsulfone, 4,4'-dichlorodiphenyl sulfoxide and 4,4'-dichlorodiphenyl ketone, which may be used alone or in combination of two or more.

To introduce some branched or crosslinked structure in PAS, a polyhalogen-substituted aromatic compound having three or more halogen substituents per molecule may additionally be used in a small amount. Preferable poly-halogen-substituted aromatic compounds, for instance, may include trihalogen-substituted aromatic compounds such as 1,2,3-trichlorobenzene, 1,2,3-tribromobenzene, 1,2,4-trichlorobenzene, 1,2,4-tribromobenzene, 1,3,5-trichlorobenzene, 1,3,5-tribromobenzene and 1,3-dichloro-5-bromobenzene as well as their alkyl-substituted compounds, which may be used alone or in combination of two or more. Of these compounds, 1,2,4-trichlorobenzene, 1,3,5-trichlorobenzene and 1,2,3-trichlorobenzene are more preferable with factors such as economy, reactivity and physical properties in mind.

Preferable polar solvents are N-alkylpyrrolidones such as N-methyl-2-pyrrolidone (NMP for short), 1,3-dialkyl-2-imidazolydinones, tetraalkylureas and aprotic organic amide solvents represented by hexaalkyltriamide phosphates because they ensure highly stable reactions systems and make it easy to obtain high-molecular-weight polymers.

The PAS used herein should have a melt viscosity in the range of 10 to 1,000 Pa·s, preferably 15 to 600 Pa·s, and more preferably 20 to 450 Pa·s as measured at 310° C. and a shear rate of 1,200 per second. With PAS having too low a melt viscosity, the mechanical properties of the resin composition may possibly become less than satisfactory. With PAS having too high a melt viscosity, the injection moldability and extrudability of the resin composition may possibly become unsatisfactory.

In the invention, the PAS may be used after washed following the completion of polymerization. Prior to use, however, it is preferable to treat PAS in an aqueous solution containing an acid such as hydrochloric acid or acetic acid, a mixed solution of water and an organic solvent or a salt solution such as an ammonium chloride solution, and then wash the PAS with a mixed solution of water and an organic solvent at an acetone/water ratio regulated to 1:2 until pH is reduced down to 8.0 or less, because the melt flowability and mechanical properties of the resin composition can be much more improved.

The PAS used herein should preferably be in a particulate form having an average particle diameter of 100 μm or greater. With PAS powders having too small an average particle diameter, problems such as degradation of the resin composition may possibly arise, because of some limitations on the amount of the powders fed to an extruder for melt extrusion and, hence, an extended residence time of the resin composition in the extruder. PAS powders with smaller particle diameters are not desired in view of handleability, transportability and measurability as well as production efficiency.

The proportion of PAS contained in the resin composition of the invention should be in the range of 1 to 60% by mass, preferably 5 to 55% by mass, and more preferably 10 to 50% by mass on the basis of the total amount of poly(aryl ketone) and PAS. Too low a proportion of PAS is detrimental to cost reductions, and likely to cause the mechanical strength, injection moldability, extrudability and deburring to become less than satisfactory. When the proportion of the PAS contained is too large or the proportion of the poly(aryl ketone) contained is too small, the heat resistance of the resin composition such as modulus in bending at high temperatures becomes insufficient.

3. Thermosetting Imide Resin

For the thermosetting imide resin, both a monomer type of polyfunctional unsaturated imide compound prior to thermosetting and a thermoset product of the polyfunctional unsaturated imide compound may be used.

Typically, the polyfunctional unsaturated imide compound is represented by the following formula (3):

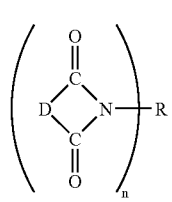

(3)

where D is a divalent organic group having a carbon-carbon double bond, R is a di- or poly-valent organic group, and n is an integer of 2 or greater. This imide compound is called a polyfunctional unsaturated imide compound because of having at least two reactive carbon-carbon double bonds.

Such polyfunctional unsaturated imide compounds may be synthesized by allowing a dicarboxylic acid component such as a dicarboxylic acid having a carbon-carbon double bond, a monoalkyl ester of the dicarboxylic acid wherein the alkyl group is a lower alkyl group having 1 to 5 carbon atoms such as a methyl and ethyl group or an anhydride of the dicarboxylic acid to react with an amine selected from a diamine and a polyamine to form an amido acid and then subjecting the obtained amido acid to a dehydration ring-closure reaction.

Preferable for the dicarboxylic acid component, for instance, are maleic anhydride, citraconic anhydride, itaconic anhydride, tetrahydrophthalic anhydride and nadic anhydride, among which maleic anhydride and nadic anhydride are more preferable although nadic anhydride is most preferred. These dicarboxylic acid components may have a substitutent such as a halogen atom (e.g., chlorine and bromine), an alkyl group (e.g., methyl and ethyl), an alkoxy group, an allyl group, an alkylidene group, an aryl group and an aralkyl group. Preferable substituents are a halogen atom, an alkyl group having 1 to 5 carbon atoms, and an allyl group. Thus, D in formula (3) must be a divalent organic group having a carbon-carbon double bond derived from these dicarboxylic acid components.

The lower-case n is an integer of 2 or greater, usually about 2 to 20. Use of diamine as the amine gives a polyfunctional unsaturated imide compound of n=2, and use of polyamine as the amine gives a polyfunctional unsaturated imide compound wherein n corresponds to the number of amino groups. The polyamine may be an oligomer such as an oligo(aniline-formaldehyde) resin. It is preferable that the lower-case n is 2 and the amine is a diamine.

The diamine, for instance, includes aliphatic diamines such as piperazine, methylenediamine, ethylenediamine, propylenediamine, 2,2-dimethylpropylene-diamine, tetramethylenediamine, pentamethylenediamine, hexamethylenediamine, 2,5-dimethylhexamethylenediamine, 3-methoxyhexamethylenediamine, heptamethylenediamine, 2,5-dimethylheptamethylenediamine, 3-methylheptamethylenediamine, 4,4-dimethylheptamethylenediamine, octamethylene-diamine, nonamethylenediamine, 5-methylnonamethylene-diamine, 2,5-dimethylnonamethylenediamine, decamethylene-diamine, 1,10-diamino-1,10-dimethyldecane, 2,11-diaminododecane, 1,12-diaminooctadecane, 2,12-diaminooctadecane and 2,17-diaminoicosane; aromatic diamines such as 4,4'-diaminobenzanilide, 4,4'-diamino-2,2'-ditrifluoromethylbiphenyl, 2,2'-di(p-aminophenyl)-6,6'-bibenzooxazole, 2,2'-di(p-aminophenyl)-5,5'-bibenzooxazole, m-phenylenediamine, 1-isopropyl-2,4-phenylenediamine, p-phenylenediamine, 4,4'-diaminodiphenylpropane, 3,3'-diaminodiphenylpropane, 4,4'-diaminodiphenylethane, 3,3'-diaminodiphenylethane, 4,4'-diaminodiphenylmethane, 3,3'-diaminodiphenylmethane,4,4'-diaminodiphenyl sulfide, 3,3'-diaminodiphenyl sulfide, 4,4'-diaminodiphenylsulfone, 3,3'-diaminodiphenylsulfone, 4,4'-diaminodiphenyl ether, 3,3'-diaminodiphenyl ether, 1,4-bis(4-aminophenoxy)benzene, benzidine, 4,4''-diamino-p-terphenyl, 3,3''-diamino-p-terphenyl, bis(p-aminocyclohexyl)mehtene, bis(p-β-amino-t-butylphenyl)ether, bis(p-β-methyl-δ-aminopentyl)benzene, p-bis(2-methyl-4-aminopentyl)benzene, p-bis(1,1-dimethyl-5-aminopentyl)benzene, 1,5-diaminonaphthalene, 2,6-diaminonaphthalene, 2,4-bis(β-amino-t-butyl)toluene, 2,4-diaminotoluene, m-xylene-2,5-diamine, p-xylene-2,5-diamine, m-xylylenediamine and p-xylylenediamine; heterocyclic diamines such as 2,6-diaminopyridine, 2,5-diaminopyridine and 2,5-diamino-1,3,4-oxadiazole; alicyclic diamines such as 1,4-diaminocyclohexane; diaminosiloxane; 2,6-diamino-4-carboxylic bezene; and 3,3'-diamino-4,4'-dicarboxylic benzidine.

Thus, R in formula (3) must typically be a divalent organic group derived from the diamine. Preferable examples of R are ethylene, hexamethylene, m-phenylene, p-phenylene, diphenylmethane, diphenyl ether, diphenylsulfone, dicyclohexylmethane, dimethylenecyclohexane, m-xylylene, diphenylcyclohexane and m-benzylidene.

Polyfunctional nadimide compounds are preferred for the polyfunctional unsaturated imide compounds represented by the formula (3). Preferably, the polyfunctional nadimide compound is a bisallylnadimide compound represented by the following formula (4). That is, the thermosetting imide resin is preferably at least one thermosetting imide resin selected from the group consisting of bisnadimide compounds represented by the following formula (4) and their thermoset products:

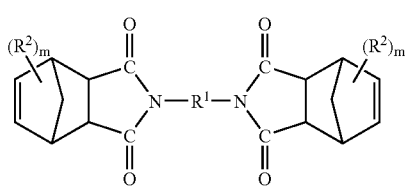

(4)

Formula (4)

where $R^1$ is a divalent organic group, $R^2$ is a halogen atom, an alkyl group, an alkoxy group, an allyl group, an alkylidene group, an aryl group or an aralkyl group, and m is 0 or an integer of 1 to 6.

In formula (4), $R^1$ is a divalent organic group derived from the aforesaid diamine. $R^2$ is a halogen atom (e.g., chlorine and bromine), an alkyl group (e.g., an alkyl group having 1 to 5 carbon atoms such as methyl and ethyl), an alkoxy group (e.g., an alkoxy group having 1 to 5 carbon atoms), an allyl group, an alkylidene group, an aryl group or an aralkyl group. Among these substituents, preference is given to the halogen atom, alkyl group or ally group. The lower-case m is 0 or an integer of 1 to 6.

Examplary polyfunctional nadimide compounds inclusive of bisnadimide compounds are N,N'-(4,4'-diphenylmethane) bisnadimide, N,N'(4,4'-diphenyloxy)bisnadimide, N,N'-hexamethylenebisnadimide, N,N'-m-benzylidenebisnadimide, nadimide of oligo(aniline-formaldehyde) resin, N,N'-(4,4'-diphenylmethane)bisallylnadimide, N,N'-hexamethylenebisallylnadimide and N,N'-m-benzylidenebisallylnadimide. Among the bisnadimide compounds, preference is given to a bisallylnadimide compound represented by the following formula (5):

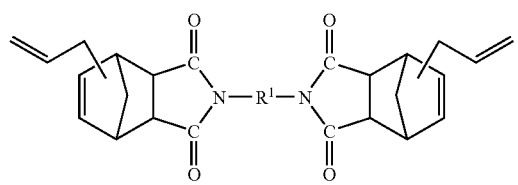

Formula (5)

where $R^1$ is a divalent organic group. In formula (5), $R^1$ is a divalent organic group derived from the aforesaid diamine. Specific examples of the bisallylnadimide compound represented by the formula (5) include compounds represented by the following formulae (6), (7) and (8):

The bisallylnadimide compound may be synthesized by allowing nadic anhydride represented by the following formula (9) or a monoalkyl ester of nadic acid to react with the aforesaid diamine and then subjecting the resultant reaction product to a dehydration ring-closure reaction.

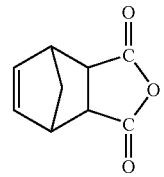

Formula (9)

Use of, for instance, the oligo(aniline-formaldehyde) resin instead of the diamine gives a polyfunctional nadimide compound where n is greater than 2.

In the invention, it is also preferable to use a bismaleimide compound represented by the following formula (10) or its thermoset product.

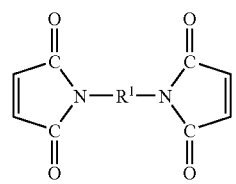

Formula (10)

where $R^1$ is a divalent organic group.

Exemplary bismaleimide compounds are N,N'-ethylenebismaleimide, N,N'-hexamethylenebismaleimide, N,N'-m-phenylenebismaleimide, N,N'-p-phenylenebismaleimide, N,N'-(4,4'-diphenylmethane)bismaleimide, N,N'-(4,4'-diphenyl ether)bismaleimide, N,N'-(4,4'-diphenylsulfone)bismaleimide, N,N'-(4,4'-dicyclohexylmethane)bismaleimide, N,N'-(α,α'-4,4'-dimethylcyclohexane)bismaleimide, N,N'-m-xylylenebismaleimide, and N,N'-diphenylcyclohexanebis-maleimide.

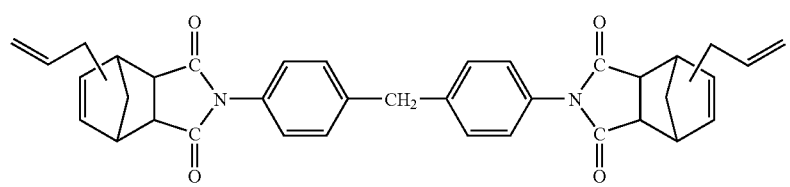

Formula (6)

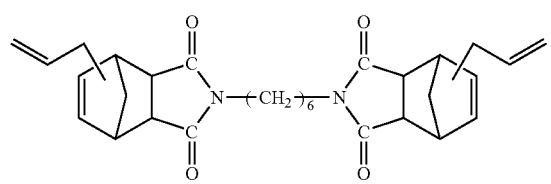

Formula (7)

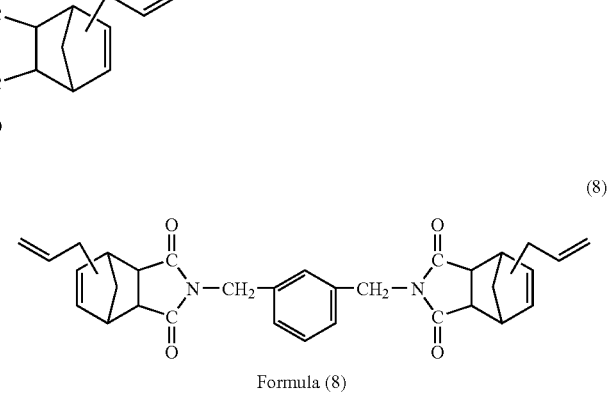

Formula (8)

If, instead of nadic anhydride or maleic anhydride, other acid anhydrides, for instance, citraconic anhydride, itaconic anhydride, tetrahydrophthalic anhydride and their halogen or alkyl-substituted products are used, it is then possible to obtain polyfunctional unsaturated imide compounds corresponding to them.

In the invention, the polyfunctional unsaturated imide compound prior to thermosetting may be used as the thermosetting imide resin; however, it is noted that a thermoset product of the polyfunctional unsaturated imide compound could be used as well. Referring to the thermosetting conditions applied, although varying with the type of the polyfunctional unsaturated imide compound, in many case, heating may be carried out at a temperature of 200 to 300° C. for 30 minutes to 72 hours. Referring here to typical thermosetting conditions for the bisallylnadimide compound, heating may be carried out at about 250° C. for about 5 hours to about 24 hours. For the thermoset product of the polyfunctional unsaturated imide compound, use should be made of preferably a thermoset polyfunctional nadimide compound, more preferably a thermoset bisnadimide compound, and even more preferably a thermoset bisallylnadimide compound.

In the invention, one or two or more polyfunctional unsaturated imide compounds or one or two or more thermoset polyfunctional unsaturated imide compounds may be used as the thermosetting imide resin. Alternatively, the polyfunctional unsaturated imide compound(s) may be used in combination with its thermoset product(s).

The thermosetting imide resin is used in an amount of 0.1 to 5 parts by mass, preferably 0.2 to 4 parts by mass, and more preferably 0.3 to 3 parts by mass per 100 parts by mass of the resin component. The thermosetting imide resin, when used at too low a proportion, is less effective for improvements in mechanical properties, etc., and too much makes voids likely to occur in molded or otherwise formed products due to the occurrence of gases in the process of molding or forming.

4. Filler

If desired, the resin composition of the invention may contain a filler(s) that is exemplified by fibrous fillers including inorganic fibrous materials such as glass fibers, carbon fibers, asbestos fibers, silica fibers, alumina fibers, zirconia fibers, boron nitride fibers, silicon nitride fibers, boron fibers and potassium titanate fibers; metallic fibrous materials such as stainless, aluminum, titanium, steel and brass; and high-melting organic fibrous materials formed typically of polyamide, fluororesin, polyester resin and acrylic resin.

Non-fibrous fillers, for instance, include particulate, powdery or flaky fillers such as mica, silica, talc, alumina, kaolin, calcium sulfate, calcium carbonate, titanium oxide, magnetic powders (e.g., ferrite), clay, glass powders, zinc oxide, nickel carbonate, iron oxide, quartz powders, magnesium carbonate and barium sulfate.

These fillers may be used alone or in combination of two or more, and may have been treated with sizing agents or surface-treating agents as needed. Exemplary sizing agents or surface-treating agents include functional compounds such as epoxy compounds, isocyanate compounds, silane compounds and titanate compounds, which may have been used to bind the filler together or treat the surface of the filler or, alternatively, added to the filler simultaneously with composition preparation.

When the filler is incorporated in the resin composition of the invention, it should be used in an amount of usually 0 to 800 parts by mass, preferably 0 to 500 parts by mass, and more preferably 0 to 300 parts by mass per 100 parts by mass of the resin component. Use of glass or other inorganic fibers as the filler may yield resin compositions improved in terms of mechanical properties such as tensile strength, bending strength, modulus in bending and deflection in bending.

5. Silane Compound

In order to improve interfacial adhesion with the filler such as glass fibers, the resin composition of the invention may additionally contain a functional group-containing silane compound as desired. Preferable for the functional group-containing silane compound are alkoxysilanes or halosilanes having per molecule at least one functional group selected from the group consisting of amino, ureido, epoxy, isocyanate and mercapto groups.

Exemplary functional group-containing silane compounds are amino group-containing silane compounds such as γ-aminopropyltrimethoxysilane, γ-aminopropyltriethoxysilane, γ-aminopropylmethyldimethoxysilane, γ-aminopropyl-ethyldiethoxysilane, γ-aminopropylmethyldiethoxysilane, N-(β-aminoethyl)-γ-aminopropyltrimethoxysilane, N-(β-aminoethyl)-γ-aminopropylmethyldimethoxysilane and γ-phenyl-γ-aminopropyltrimethoxysilane; ureido group-containing silane compounds such as γ-ureidopropyl-trimethoxysilane, γ-ureidopropylmethyl-trimethoxysilane, γ-ureidopropyltriethoxysilane, γ-ureidopropylmethyl-triethoxysilane and γ-(2-ureidoethyl)aminopropyl-trimethoxysilane; epoxy group-containing silane compounds such as γ-glycidoxypropyltrimethoxysilane, γ-glycidoxy-propyldimethylmethoxysilane, γ-glycidoxypropyltriethoxy-silane, γ-glycidoxypropylmethyldiethoxysilane, β-(3,4-epoxycyclohexyl)ethyltrimethoxysilane and β-(3,4-epoxycyclohexyl)ethyltriethoxysilane; isocyanate group-containing silane compounds such as γ-isocyanatopropyl-trimethoxysilane, γ-isocyanatopropylmethyldimethoxysilane, γ-isocyanatopropyltriethoxysilane, γ-isocyanatopropyl-methyldiethoxysilane, γ-isocyanatopropylethyldimethoxy-silane, γ-isocyanatopropylethyldiethoxysilane and γ-isocyanatopropyltrichlorosilane; and mercapto group-containing silane compounds such as γ-mercaptopropyl-trimethoxysilane, γ-mercaptopropyltriethoxysilane, γ-mercaptopropylmethyldimetoxysilane, γ-mercaptopropyl-methyldiethoxysilane, β-mercaptoethyltrimethoxysilane, β-mercaptoethyltriethoxysilane and β-mercaptoethyldimethoxy-silane.

These functional group-containing silane compounds are used in an amount of usually 0.01 to 10 parts by mass, preferably 0.05 to 10 parts by mass, and more preferably 0.1 to 5 parts by mass per 100 parts by weight of the resin component. Too little silane compounds are less effective for mechanical property improvements. Conversely, too much silane compounds make voids likely to occur in molded or formed products owing to the generation of gasses in the process of molding or forming. In most cases, the functional group-containing silane compound in an amount of the order of 0.3 to 1 part by mass per 100 parts by mass of the resin component works sufficiently.

6. Other Thermoplastic Resin

Other thermoplastic resin(s) may be added to the resin composition of the invention as long as they are not detrimental to the objects of the invention. Preferable for the other thermoplastic resin(s) is a thermoplastic resin that is stable at high temperatures.

The thermoplastic resin used herein, for instance, include thermoplastic polyesters such as polyethylene terephthalate and polybutylene terephthalate; fluororesins such as polytetrafluoroethylene, tetrafluoroethylene/hexa-fluoropropylene copolymers, tetrafluoroethylene/perfluoro-alkylvinyl ether copolymers, polychlorotrifluoroethylene, polyvinylidene fluoride, polyvinylidene fluoride/hexa-fluoropropylene copolymers, propylene/tetrafluoroethylene copolymers, vinylidene fluoride/chlorotrifluoroethylene copolymers and ethylene/hexafluoropropylene copolymers; polyacetal; polystyrene; polyamide; polycarbonate; polyphenylene ether; polyalkyl acrylate; ABS resin; and polyvinyl chloride.

These thermoplastic resins may be used alone or in combination of two or more. The other thermoplastic resin(s) is usually used in an amount small enough to be not detrimental to various properties of the resin composition comprising poly(aryl ketone) and PAS as resin components. More specifically, the other thermoplastic resin(s) is used in an amount of up to 50 parts by mass, preferably up to 30 parts by mass, and more preferably up to 10 parts by mass per a total of 100 parts by mass of poly(aryl ketone) and PAS.

7. Other Additives

In addition to the aforesaid additives, the resin composition of the invention, for instance, may contain suitable amounts of resin improvers such as ethylene glycidyl methacrylate, lubricants such as pentaerythritol tetrastearate, thermosetting resins, antioxidants, ultraviolet absorbers, nucleating agents such as boron nitride, flame retardants, and coloring agents such as dyes and pigments.

8. Resin Composition

The resin composition of the invention may be prepared by facilities and processes commonly used for synthetic resin composition preparation. For instance, the respective starting material components are premixed together in a mixing machine such as a Henschel mixer or tumbler, and if required, the premix is added and further mixed with the filler such as glass fibers. Then, the mixture is kneaded in a single- or twin-screw extruder and extruded through it into the pellet to be molded or formed. Alternatively, a master batch comprising a part of the necessary components is mixed with another part. To enhance the dispersibility of each component, it is also possible to pulverize a part of the starting materials to a uniform particle diameter and mix that part with another part for melt extrusion.

The resin composition of the invention, because of being thermoplastic, may be molded or otherwise formed by ordinary melt molding or forming processes such as injection molding or extrusion into sheets, films, tubes or other articles, which are much more improved in terms of high-temperature rigidity, flame retardancy, heat resistance, chemical resistance, dimensional stability, mechanical properties or the like, and so may find a wide range of applications where various such properties are in need.

More specifically, the resin composition of the invention can be used in the following fields.

i) For Aircrafts

In-engine components for aircrafts such as transformer housings, battery holders and fuel-line brackets, aircraft interior components such as cockpit pedal supports and instrumental supports, aircraft on-wing fueling, trim units, aircraft exterior parts, wire protective tubing, and electrical harness sleeving.

ii) For Automobiles

Rotor arms, thrust washers and seals, shock absorber bearing coatings, alternator covers, and automatic transmission seal rings.

iii) For Electric, Electronic and Communications Fields

Wafer carriers, wires, cable coatings, connectors, switches, relays, wafer carrier baskets, cables, and magnetic head trays.

iv) For Medical Purposes

Analytical equipment components, kidney dialysis machine components, thermal or steam sterilization, and hearing aid components.

v) For Industrial Purposes

Compressor plates, seals and pump components used in gas and fluid transport systems, electrostatic spray coating, plasma spray coating, valve lining, and valve seals.

ADVANTAGES OF THE INVENTION

The present invention provides a resin composition containing a poly(aryl ketone) and a poly(arylene sulfide), which is substantially improved in terms of the compatibility of both, and excels in moldability or formability, melt flowability, mechanical properties, etc. while keeping high levels of various properties such as heat resistance, flame retardancy, chemical resistance and dimensional stability. The resin composition of the invention is improved in terms of melt flowability upon melt molding or forming, too, so that burring upon injection molding can be reduced. Undetrimental to various properties such as heat resistance, flame retardancy, chemical resistance and dimensional stability that both the poly(aryl ketone) and poly(arylene sulfide) possess, the resin composition of the invention keeps high levels of such various properties. Taking full advantages of these various properties, the resin composition of the invention may be used in a wide range of fields inclusive of a high heat-endurance application.

EXAMPLES

More specifically but not exclusively, the present invention is now explained with reference to some inventive and comparative examples. The physical properties given later were measured as follows.

(1) Tensile Properties (Tensile Strength and Tensile Elongation)

The tensile strength and tensile elongation (tensile elongation at break) of the resin composition were measured at a temperature of 23° C., an inter-gauge point distance of 50 mm and a crosshead speed of 5 mm/minute pursuant to ASTM D638.

(2) Bending Properties (Modulus in Bending and Bending Strength)

The modulus in bending and bending strength of the resin composition were measured at a temperature of 23° C., an inter-support distance of 80 mm and a crosshead speed of 3.5 mm/minute pursuant to ASTM D790.

(3) Izod Impact Strength

The Izod impact strength of the resin composition was measured at a temperature of 23° C. pursuant to ASTM D256.

(4) Melt Viscosity

The melt viscosity was measured at a temperature of 310° C. and a shear rate of 1,200/second, using "Capirograph" made by Toyo Seiki Co., Ltd.

(5) pH of PAS

The pH of PAS was measured in a mixed solution consisting of acetone/water at a 1/2 ratio. More specifically, 20 grams of polymer were added to and mixed with 50 ml of acetone, and the mixture with 100 ml of ion exchanged water added thereto was well shaken in a shaker for 30 minutes, after which 60 ml of the supernatant was dispensed for pH measurement.

(6) Evaluation of Burring

A pellet obtained by melt extrusion was injection molded through a mold having a cavity of 70 mm in diameter and 3 mm in thickness and held at a temperature of 150° C. at a pressure 1.05 times as high as the minimum packing pressure at which the resin composition was full packed. Then, lengths of burrs occurring in a 20-μm thick, 5-mm wide gap provided on the circumference of the mold (a slit for evaluation of burrs) were measured by means of a magnifying projector.

(7) Deflection Temperature Under Load

The deflection temperature under load of the resin composition (1.82 MPa) was measured pursuant to ASTM D648.

Synthesis Example 1

A polymerizer was charged with 720 kg of N-methyl-2-pyrrolidone (NMP) and 420 kg of sodium sulfide pentahydrate containing 46.21% by weight of sodium sulfide ($Na_2S$), purged by nitrogen gas, and heated gradually to 200° C. under agitation to distill off 160 kg of water simultaneously with dissipation of 62 moles of $H_2S$.

After the above dehydration step, 364 kg of p-dichlorobenzene and 250 kg of NMP were added to the polymerizer for a 4.5-hour reaction at 220° C. with stirring. Following this, while stirring was continued, 59 kg of water were poured under pressure in the reaction product, which was then heated to 255° C. for a further 5-hour reaction. After the completion of the reaction, the reaction product was cooled down to around room temperature, and passed through a 100-mesh screen to sieve out a particulate polymer. The polymer was washed twice with acetone and three times with water to obtain a polymer. This polymer was further washed with a 3% aqueous solution of ammonium chloride and then with water.

After dehydration, the collected particulate polymer was dried at 105° C. for 3 hours. PPS was obtained in an 89% yield with a melt viscosity of 140 Pa·s and a pH of 6.5.

Inventive Examples 1–6 & Comparative Examples 1–4

After dry, uniform blending in a Henschel mixer, the respective components shown in Table 1 were supplied to a 46-mmφ twin-screw kneader extruder (PCM-46 made by Ikegai Corp.), where they were kneaded together at a cylinder temperature of 260 to 385° C. to prepare pellets. Each pellet was dried at 180° C. for 6 hours, and then injection molded through an injection molding machine (IS-75 made by Toshiba Machine Co., Ltd.) at a mold temperature of 180° C. and a cylinder temperature of 300 to 380° C. to prepare pieces for tensile testing and bending testing. The results are shown in Table 1 with the composition of each resin composition.

TABLE 1

| | Inventive Example | | | | | | Comparative Example | | | |
|---|---|---|---|---|---|---|---|---|---|---|
| | 1 | 2 | 3 | 4 | 5 | 6 | 1 | 2 | 3 | 4 |
| PEEK (%) | 71 | 71 | 71 | 57 | 86 | 71 | 0 | 71 | 57 | 86 |
| PPS (%) | 29 | 29 | 29 | 43 | 14 | 29 | 100 | 29 | 43 | 14 |
| BANI-M (part) | 1 | — | — | 1 | 1 | — | — | — | — | — |
| BANI-X (part) | — | 1 | — | — | — | — | — | — | — | — |
| BANI-H (part) | — | — | 1 | — | — | — | — | — | — | — |
| BANI-M thermoset product (part) | — | — | — | — | — | 1 | — | — | — | — |
| Glass fibers (part) | 43 | 43 | 43 | 43 | 43 | 43 | 43 | 43 | 43 | 43 |
| Tensile strength (MPa) | 184 | 185 | 179 | 175 | 178 | 185 | 170 | 170 | 160 | 164 |
| Tensile elongation (%) | 2.1 | 2.4 | 2.0 | 1.9 | 2.2 | 2.0 | 1.9 | 1.9 | 1.5 | 1.6 |
| Bending strength (MPa) | 265 | 254 | 260 | 251 | 257 | 265 | 235 | 230 | 205 | 211 |
| Modulus in bending (MPa) | 11330 | 11120 | 11040 | 11200 | 10050 | 11800 | 11500 | 11030 | 10520 | 9920 |
| Izod impact strength (J/m) | 62 | 62 | 61 | 60 | 59 | 65 | 60 | 60 | 49 | 60 |
| Length of burrs (μm) | 15 | 15 | 15 | 15 | 15 | 15 | 400 | 15 | 15 | 45 |
| Deflection temperature under load (° C.) | 300 | 300 | 300 | 285 | 305 | 301 | 265 | 292 | 280 | 300 |

Note:
(1) PEEK: Poly (ether ether ketone); VICTREX PEEK 150P (VICTREX-MC)
(2) BANI-M (Bisallylnadimide compound of formula (6), Maruzen Oil Co., Ltd.)
(3) BANI-X (Bisallylnadimide compound of formula (7), Maruzen Oil Co., Ltd.)
(4) BANI-H (Bisallylnadimide compound of formula (8), Maruzen Oil Co., Ltd.)
(5) Thermoset product of BANI-M (thermoset by heat-treating the bisallylnadimide compound of formula (6) at 250° C. for 10 hours)
(6) Glass fibers: FT689 made by Asahi Fiber Glass Co., Ltd.

As can be seen from the results shown in Table 1, the resin compositions (Inventive Examples 1–6) with the addition thereto of the thermosetting imide resin before and after thermosetting are better than the corresponding resin compositions (Comparative Examples 2–4) without containing the thermosetting imide resin in terms of mechanical properties, deburring and deflection temperature under load.

For instance, comparisons of Inventive Examples 1–3 and 6 with Comparative Example 2 reveal that the inventive resin compositions are much superior to the comparative one in terms of every mechanical property and deflection temperature under load. A comparison of Inventive Example 4 with Comparative Example 3 indicates that the inventive resin composition is much superior to the comparative one in terms of mechanical properties as well as other properties. A comparison of Inventive Example 5 with Comparative Example 4 shows that the inventive resin composition is not only superior to the comparative one in terms of every mechanical property but is also much improved in terms of deburring.

The resin composition of the invention is significantly improved in terms of mechanical properties, especially tensile strength and bending strength, and improved in terms of other properties as well. The resin composition (Comparative Example 1) containing only PAS and glass fibers is inferior in terms of mechanical properties, deburring and deflection temperature under load.

What we claim is:

1. A resin composition, comprising:
   a resin component containing (A) 40 to 99% by mass of a poly(aryl ketone) and (B) 1 to 60% by mass of a poly(arylene sulfide), and
   (C) 0.1 to 5 parts by mass, per 100 parts by mass of said resin component, of at least one thermosetting imide resin selected from the group consisting of a polyfunctional unsaturated imide compound and a thermoset product thereof, wherein said polyfunctional unsaturated imide compound is a bisnadimide compound represented by the following Formula (4):

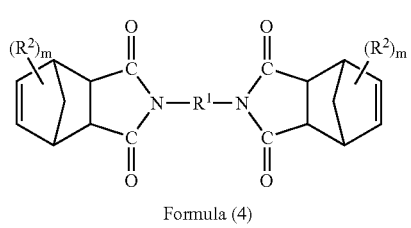

Formula (4)

where $R^1$ is a divalent organic group, $R^2$ is a halogen atom, an alkyl group, an alkoxy group, an allyl group, an alkylidene group, an aryl group or an aralkyl group, and m is 0 or an integer of 1 to 6.

2. The resin composition according to claim 1, wherein said poly(aryl ketone) (A) is at least one poly(aryl ketone) selected from the group consisting of a poly(ether ether ketone) comprising a repeating unit represented by the following formula (1) and a poly(ether ketone) comprising a repeating unit represented by the following formula (2):

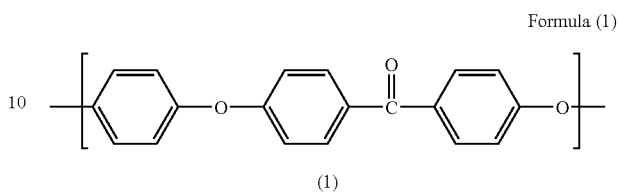

Formula (1)

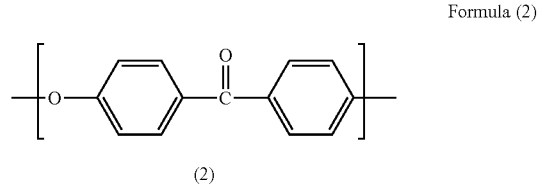

Formula (2)

3. The resin composition according to claim 1, wherein said poly(arylene sulfide) (B) is a poly(arylene sulfide) having a melt viscosity of 10 to 1,000 Pa·s, as measured at a temperature of 310° C. and a shear rate of 1,200/second.

4. The resin composition according to claim 1, wherein said poly(arylene sulfide) (B) is a poly(phenylene sulfide).

5. The resin composition according to claim 1, wherein said poly(arylene sulfide) has a pH of up to 8.0, as measured in a mixed water/organic solvent solution regulated to an acetone/water ratio of 1:2.

6. The resin composition according to claim 1, wherein said bisnadimide compound is a bisallylnadimide compound represented by the following formula (5):

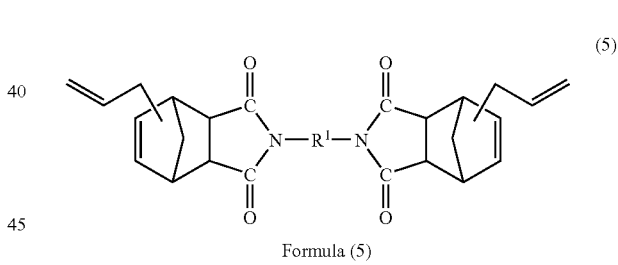

Formula (5)

where $R^1$ is a divalent organic group.

7. The resin composition according to claim 6, wherein said bisallylnadimide compound is a compound represented by the following formula (6):.

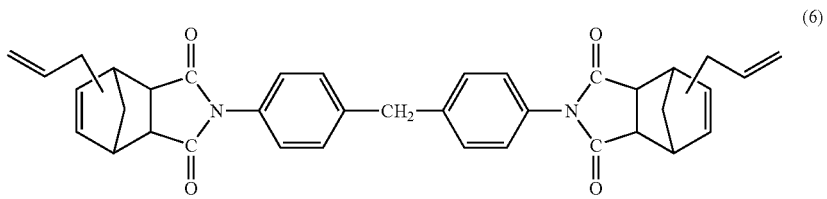

Formula (6)

8. The resin composition according to claim 6, wherein said bisallylnadimide compound is a compound represented by the following formula (7):.

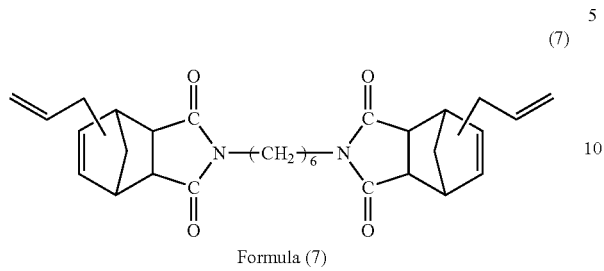

Formula (7)

9. The resin composition according to claim 6, wherein said bisallylnadimide compound is a compound represented by the following formula (8):.

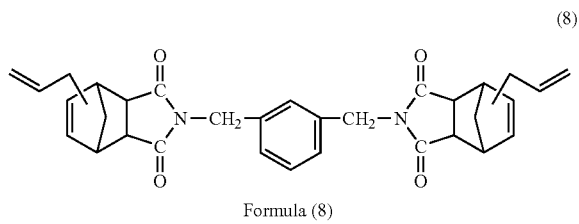

Formula (8)

10. The resin composition according to claim 6, wherein said bisallylnadimide compound has been synthesized by allowing nadic anhydride represented by the following formula (9) or a monoalkyl ester of nadic acid to react with a diamine, followed by a dehydration ring-closure reaction:.

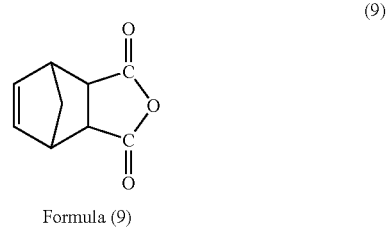

Formula (9)

11. The resin composition according to claim 1, wherein said thermosetting imide resin (C) is a bisnadimide compound prior to thermosetting.

12. The resin composition according to claim 1, wherein said thermosetting imide resin (C) is a thermoset product of a bisnadimide compound.

13. The resin composition according to claim 12, wherein said thermoset product is obtained by heating said bisnadimide compound at a temperature of 200 to 300° C. for 30 minutes to 72 hours for thermosetting.

14. The resin composition according to claim 12, wherein said thermoset product is a thermoset product of a bisallylnadimide compound.

15. The resin composition according to claim 1, which further contains a filler in an amount of up to 800 parts by mass per 100 parts by mass of said resin component.

16. The resin composition according to claim 15, wherein said filler is a fibrous filler.

* * * * *